Patented Jan. 19, 1932

1,841,962

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Original application filed June 16, 1927, Serial No. 199,420, and in Germany August 9, 1926. Divided and this application filed July 28, 1928. Serial No. 296,088.

The subject matter of the present application has been divided out from our copending application for the manufacture of vat dyestuffs, Ser. No. 199,420, filed June 16, 1927, and relates to the manufacture of vat dyestuffs which are considered to be ms-anthradianthrones.

We have found that valuable vat dyestuffs are obtained when 2.2'-dimethyl-ms-naphthodianthrone or its derivatives such as halogenated 2.2'-dimethyl-ms-naphthodianthrones are subjected to the influence of agents with an alkaline reaction, preferably alkaline condensing agents, for example calcined sodium carbonate, sodium acetate, potassium carbonate, barium oxid, caustic potash, alcoholic potash, and the like, if desired in the presence of solvents or diluents.

In this reaction probably 4 atoms of hydrogen are split off, thereby leading to the ring system of ms-anthradianthrone, as in the following formulæ:

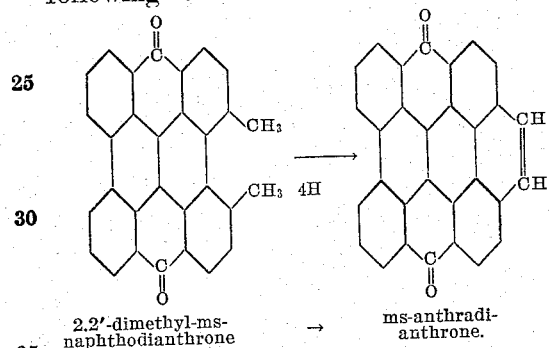

2.2'-dimethyl-ms-naphthodianthrone → ms-anthradianthrone.

The following examples will further illustrate the nature of the said invention which however is not restricted thereto. The parts are by weight.

Example 1

1 part of 2.2'-dimethyl-ms-naphthodianthrone is introduced at 110° to 120° C. into a melt of 5 parts of caustic potash and 5 parts of ethyl alcohol. The temperature is raised to from 170° to 175° C. and maintained at that temperature for another 6 hours, the melt being then dissolved in water. After the resulting dyestuff has been precipitated by an air blast, it is filtered by suction; the brown reaction product may be purified by treatment with hypochlorite solution. The dyestuff dissolves in concentrated sulfuric acid to a violet solution, and gives golden-yellow dyeings, fast to light and chlorine, on cotton from a blue-violet vat.

Example 2

1 part of 2.2'-dimethyl-ms-naphthodianthrone is introduced at 210° C. into a melt of 10 parts of caustic potash, and after being kept at from 220° to 230° C. for another two hours, the mass is treated as in Example 1. The resulting dyestuff is identical with that obtainable according to that example.

Example 3

1 part of 4.4'-dichlor-2.2'-dimethyl-ms-naphthodianthrone is stirred and boiled in 10 parts of nitrobenzene, with addition of 10 parts of potassium carbonate, for about 4 hours, then filtered by suction after cooling, the resulting dyestuff being freed from the potassium carbonate by boiling with water. The product is a brownish-yellow powder, which dissolves to a violet solution in concentrated sulfuric acid and gives orange-yellow dyeings on cotton from a brown-violet vat.

Example 4

2.2'-dimethyl-ms-naphthodianthrone is stirred and boiled in 10 parts of nitrobenzene, with addition of 4 parts of barium oxid, for about 4 hours. After filtration by suction, the resulting dyestuff is freed from admixed barium oxid by boiling with dilute hydrochloric acid; it is identical with the product obtained in Example 1.

What we claim is:

1. The process of producing new vat dyestuffs which comprises subjecting a 2.2'-dimethyl-ms-naphthodianthrone to the action of an alkaline condensing agent.

2. The process of producing new vat dyestuffs which comprises subjecting a 2.2'-dimethyl-ms-naphthodianthrone to the action of an alkaline condensing agent in a diluting medium.

In testimony whereof we affix our signatures.

MAX ALBERT KUNZ.
KARL KÖBERLE.